United States Patent [19]

Gaymans et al.

[11] 4,446,304

[45] May 1, 1984

[54] HIGHLY STABLE NYLON 4,6 OBJECTS

[75] Inventors: Reinoud J. Gaymans, Boekelo; Pieter J. van Asperen, Geleen, both of Netherlands

[73] Assignee: Stamicarbon B.V., Geleen, Netherlands

[21] Appl. No.: 451,337

[22] Filed: Dec. 20, 1982

Related U.S. Application Data

[63] Continuation-in-part of Ser. No. 247,547, Mar. 25, 1981, abandoned.

[30] Foreign Application Priority Data

| Mar. 26, 1980 | [NL] | Netherlands | 8001762 |
| Mar. 25, 1981 | [CA] | Canada | 373813 |
| Mar. 25, 1981 | [CO] | Colombia | 200472 |
| Mar. 25, 1981 | [EP] | European Pat. Off. | 81200325.9 |
| Mar. 25, 1981 | [TW] | Taiwan | 7010850 |
| Nov. 12, 1982 | [EP] | European Pat. Off. | 82201432 |

[51] Int. Cl.$^3$ ............................................. C08G 69/26
[52] U.S. Cl. ..................................... 528/335; 264/319; 264/328.1; 528/336
[58] Field of Search ............... 528/335, 336; 264/319, 264/328.1

[56] References Cited

U.S. PATENT DOCUMENTS

| 2,130,948 | 9/1938 | Carothers | 528/335 |
| 2,172,374 | 9/1939 | Flory | 528/335 |

FOREIGN PATENT DOCUMENTS 614625 12/1948 United Kingdom ................ 528/335

OTHER PUBLICATIONS

Kirk–Othmer–Encyclopedia of Chemical Technology, Second Edition, pp. 98–101.

*Primary Examiner*—Harold D. Anderson

[57] ABSTRACT

Shaped articles are described molded from a nylon 4,6 polyamide, substantially consisting of [NH—(CH$_2$)$_4$—NH—CO(CH$_2$)$_4$—CO] units and having a relative viscosity, measured at 20° C., on a solution in 96% sulfuric acid containing 1 g of polyamide in 100 ml of solution, of at least 2.0, and having highly stable high temperature, zinc-ion and chloride ion resistance characteristics.

10 Claims, No Drawings

HIGHLY STABLE NYLON 4,6 OBJECTS

This application is a continuation-in-part of application Ser. No. 247,547 now abandoned and also relates to copending applications 247,548 and 247,545, each filed Mar. 25, 1981, the disclosures of which are incorporated herein by reference.

This invention relates to the manufacture of polyamide-based shaped articles, such as are formed by injection or compression molding, or by extrusion, from, specifically, a nylon 4,6-polyamide material. The articles thus provided are of a novel nature, and possess relatively high stability and resistance to deterioration upon exposure to e.g., high temperatures, and/or zinc ion and/or chloride ion environments.

The manufacture of shaped articles based upon such well known polyamides as polycaprolactam (nylon 6) or polyhexamethyleneadipamide (nylon 6,6) or polylaurolactam (nylon 12), is already known; however, such articles have limitations in use derived from the characteristics of the polyamide forming their structure. These disadvantages can be only slightly improved by such efforts as the use of a modified nylon 6, nylon 6,6 or nylon 12 polyamide, e.g., by introducing additives or by annealing procedures, or by the use of a mixture of such polyamides with a reinforcing filler, such as glass fiber. Further, articles made from nylon 6 and nylon 6,6 are also characterized by their low-notched impact resistance.

Accordingly, it is an object of the present invention to provide for the manufacture of shaped articles using a nylon 4,6 polyamide, which articles surprisingly possess advantageously high notched impact resistance, high HDT values, improved wear resistance, and improved stability upon exposure to environments, particularly including exposure to high temperatures, zinc ion- and chloride ion-containing liquids, and also alcohol-containing fuels.

According to the present invention, objects are produced by shaping, from the melt, the nylon 4,6 polyamide, optionally mixed with fillers, reinforcing fillers, pigments, antioxidants and other conventional additives, and wherein the nylon 4,6-polyamide used substantially consists of units of

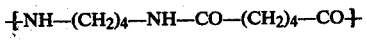

having a relative viscosity of at least 2.0, as measured at 20° C. on a solution in 96% sulfuric acid containing 1 g of polyamide in 100 ml of solution.

Suitable nylon 4,6 polyamides can generally be obtained by use of processes described in the above-mentioned copending application Ser. Nos. 247,548 and 247,545. When so formulated, the final after-condensed nylon 4,6 material obtained by the processes of those applications, can be readily processed, from the melt, for the manufacture of the shaped articles contemplated by the present invention. Shaped articles thus made from such polyamides have an HDT value in the virgin (i.e., unmodified) state, as measured on a sample dry as molded, which is higher than 100° C. By contrast, articles of virgin nylon 6,6 have an HDT value of only about 95° C. The notched impact resistance of objects made of nylon 4,6 is also surprisingly much higher than that of objects made of nylon 6 or nylon 6,6, at comparable relative viscosities.

These nylon 4,6 articles can further be manufactured using the already known injection molding and extrusion machines. The flow characteristics of such polyamide and the appearance of articles made from it are otherwise comparable to those of polyamide 6 or 6,6.

The nylon 4,6 used herein is prepared from adipic acid and 1,4-butanediamine. Adipic acid is a product commercially obtainable on a large scale. Butanediamine is also commercially obtainable and can be prepared from hydrocyanic acid and acrylonitrile, with hydrogenation of the succinonitrile formed.

The polymerization or polycondensation of butanediamine with adipic acid can be generally effected in the manner already known from the preparation of nylon 6,6. First, the salt of the diamine with the dicarboxylic acid is formed, after which this is converted by condensation into a polymer. The molecular weight of the polymer can be raised by after-condensation of the solid phase or the melt. However, the processes for the preparation of nylon 4,6 as particularly described in the copending application Ser. Nos. 247,548 and 247,545, are advantageously used to make the polyamides to be employed in the practice of this invention.

According to the present invention, shaped articles thus made from these nylon 4,6 materials have a relative viscosity ($\eta_{rel}$) of 2.0 or higher. Advantageously, the polymer should have a relative viscosity of 2.5 or higher. For making articles which must satisfy stringent requirements, preference is given to the use of a nylon 4,6 having a relative viscosity of 3 to 5. However, nylon 4,6 polyamides having a very high relative viscosity, for instance above about 4, are more difficult to process, and use thereof is therefore not preferred.

Nylon 4,6 generally has a melting point of between 275° C. and 300° C., depending on its method of production. Such a polyamide is readily processed at temperatures of between 290° C. and 330° C. without undergoing appreciable degradation, provided water and oxygen are excluded. An advantage presented in comparison with nylon 6 is that nylon 4,6 polymer does not require extraction after the polycondensation for removal of monomer and/or oligomers.

In the practice according to the invention, use is preferably made of the polyamide consisting wholly of units of

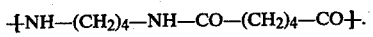

Optionally, however, the nylon 4,6 polyamide may contain up to about 20 wt. %—related to the total polymer—of units derived from other polyamide-forming compounds. Examples of such other difunctional amino/carboxylic compounds include aminocarboxylic acids and lactams such as caprolactam, undecalactam and laurolactam; aliphatic-, cycloaliphatic- or aromatic dicarboxylic acids such as succinic acid, sebacic acid, isophthalic acid and terephthalic acid; aliphatic-, cycloaliphatic- and aromatic diamines such as hexamethylenediamine, 1,4-diaminomethylcyclohexane, and p-phenylenediamine. By preference, not more than 10 moles % of the diaminobutane or of the adipic acid is replaced by other diamines or dicarboxylic acids.

The nylon 4,6 polyamide employed may also be employed with the addition of the usual fillers, such as carbon black, chalk, talc, alumina and silica, reinforcing fillers such as glass fibers, antioxidants, antistatic agents, and pigments. The material may also be mixed with an elastomer or a thermoplastic other polymer. More in particular, the use may be considered of amounts of between 5 and 25% by weight, related to the polyamide, of a rubbery or non-rubbery polymer containing carboxyl groups. The polyamide can be processed to intermediate products, such as stamped, cut or molded profiles, etc. It can also be processed to such articles as cases for electrical appliances, tubes, hoses, couplings, etc., and components for electric and mechanical equipment, etc.

The nylon 4,6 articles may also be readily worked by mechanical cutting, tapping or threading, etc., tools.

The invention will now be elucidated by means of the following Examples, without being restricted to the modes of realization described therein.

EXAMPLE I

Nylon 4,6 in powder form, as prepared by the process according to U.S. application Ser. Nos. 247,548 and 247,545, in particular according to example I of the latter application, was carefully dried in vacuo over $P_2O_5$ at 50° C. The powder was compressed to a tablet measuring 15 cm × 10 cm × 0,32 cm, under nitrogen at a temperature of about 320° C. After cooling and conditioning of the tablet at 23° C. and 50% rel. hum., test bars (12 cm × 1,27 cm × 0,32 cm) were cut from it. On these test specimens, the softening temperature was determined in accordance with ISO R75, method A (hereinafter to be referred to as the HDT value). The HDT value was over 110° C. The relative viscosity of the compressed polymer (measured at 20° C. on a solution in 96% sulfuric acid containing 1 g of polymer in 100 ml of solution) was 2.0.

For comparison, test bars were made in the same way of nylon 6 (commercial product Ultramid $B_3$ which is a trade mark of BASF) by compression molding at 250° C., and of nylon 6,6 (commercial product Ultramid $A_3$, which is a trademark of BASF) by compression moulding at 280° C. The HDT values of these latter test bars, dry as molded, were respectively only 80° C. and 95° C.

EXAMPLE II

Nylon 4,6 powder, prepared by the process according to Example IV of copending application 247,545, was dried in the same way as described in Example I, above. The powder was injection molded to form test bars on a Teknika Type SR 22 injection molding machine, at a temperature of the material of about 310° C. and a mold temperature of 80° C. The relative viscosity of the injection-molded material was 2.85.

The Izod notched resistance of both dry and conditioned (23° C., 65% rel. hum.) test bars was determined in accordance with ISO R 180, with a curvature radius of the notch amounting to 0.01 inch, at 23° C. and −20° C. The results are shown in the following Table.

For comparison, test bars were made in the same way of nylon 6 (commercial product Ultramid $B_3$ of BASF) by injection molding at a temperature of the material of 240° C., and of nylon 6,6 (commercial product Ultramid $A_3$ of BASF) by injection molding at 270° C. The Izod notched impact resistance of these specimens was determined too. These data are also shown in the following Table, for comparison. Conditioning of the test bars is performed by maintaining the testbars in an environment of desired relative humidity (example I: 50% rel.-hum.; example II 65% rel.hum.) at a temperature of 70° C. until constant weight of the samples, and cooling the testbars to 23° C. under the same relative humidity.

TABLE

| | Izod Value | |
|---|---|---|
| | at 23° C. $KJ/m^2$ | at −20° C. $KJ/m^2$ |
| Nylon 4,6 dry | 10.0 | — |
| Conditioned | 100 | 7 |
| Nylon 6 dry | 5 | — |
| Conditioned | 25 | 4 |
| Nylon 6,6 dry | 3 | — |
| Conditioned | 18 | 3 |

EXAMPLE III

Nylon 4,6 in powder form, as used in Example II above was dried in the same way as described in Example I, above. The powder was injection molded to form discs, under nitrogen at a temperature of about 320° C.

The discs were subjected to wearing by a polished steel pen, sliding in a circular path over the disc surface. The wear is measured as the weight of material removed under a loading of 1 Newton per meter of sliding path of the pen over the disc surface.

The wear of a nylon 4,6 disc was measured to be about three times less than the compared wear of a test disc made of Nylon 6 (commercial product Akulon S-223E).

As is apparent from the foregoing disclosure and Examples, the shaped articles formed from the herein described nylon 4,6 present significant, nonobvious advantages over the conventional use of other polyamide structures, in that valuably much higher HDT, notch resistance and wear resurfance characteristics are thereby achieved.

The process is thus especially well suited for the production of articles subjected to rigorous thermal and stress conditions, wherein the material, in the virgin state, has to have a HDT of at least 100° C., as measured on a sample dry as molded, and an Izod notched impact strength measured at 23° C. on a sample dry as molder of at least 5 $KJ/m^2$ and preferably of more than 7.5 $KJ/m^2$.

In particular, shaped articles made from nylon 4,6-polyamides provided according to this invention, are useful for devices associated with internal combustion engines, or steam engines, or the like, as components thereof. As is well known, a modern internal combustion engine requires various accessory devices in the nature of filter housings, overflow coolant reservoirs, and reservoirs for brake, and power accessory fluids, carburetor cups, supporting members and brackets for levers, springs and cables, and fuel and air lines and connectors therewith, electrical housings, pump impellers, coolant fan blades, and the like. The shaped objects provided by the present invention are particularly useful in such thermally and mechanically stressed environmental conditions, particularly for such articles which are likely to come in contact with alcohol-containing fuels, and at relatively high temperatures.

Further, in such instances of internal combustion engines being used with vehicles (automobiles, airplanes, boats, motorcycles, etc.), there is also exposure in the environment to adjacent zinc-galvanized metal parts, and to chloride ions via sea water exposure or road salts, or ordinary motorway contaminants. The nylon 4,6 articles provided by this invention are of particular value and have surprisingly unexpected stress resistance and stability under such arduous environmental conditions. The following further examples will thus illustrate, under such conditions, the substantial improvement in properties afforded by the instant nylon 4,6-polyamides as against the past and present commercial nylon 6 and nylon 6,6-polyamide materials (which in general are unsatisfactory and cannot be used in such environments).

EXAMPLE IV (Hot water/steam and thermal stability of injection molded polyamide test bars.)

The hot water/steam stability and the thermal stability of nylon 4,6 was compared to that of nylon 6 and nylon 6,6 using the ISO R 527 standard test method.

Test bars (12 cm×1,27 cm×0,16 cm) for the tensile strength measurements were injection molded from samples of the following (unstabilized) polyamides:
Nylon 6: Ultramid B3 (which is a trade mark of BASF)
Nylon 6,6: Ultramid A3 (which is a trade mark of BASF)
Nylon 4,6: a polytetramethylene adipamide sample made as described above and having a relative viscosity value 3.4.

The test bars were molded using a standard laboratory injection molding machine for nylon 6 and nylon 6,6 the molding conditions were in accordance with those set forth by the supplier. For nylon 4,6 a nozzle temperature of 310° C. and a mold temperature of 80° C. were used, an injection pressure of 1500 atm. and an after injection pressure of 370 atm.

The aging of the testbars was carried out in an autoclave at 120° C. under water/steam atmosphere under nitrogen pressure for the hot water/steam stability test and in an air oven at 120° C. for the thermal stability tests. The time after which tensile strength fell to 50% of its initial value was then determined. The results of these measurements are presented in table 1.

TABLE 1

|  | Hot water/steam stability time to decrease of tensile strength to 50% | thermal stability time to decrease of tensile strength to 50% |
|---|---|---|
| Nylon 4,6 | >7 weeks | >5 weeks |
| Nylon 6,6 | about 5 weeks | about 2½ weeks |
| Nylon 6 | about 4 weeks | about 2½ weeks |

EXAMPLE V (Stress crack resistance of injection molded test bars in zinc chloride environment.)

The stress crack resistance in zinc chloride environment of the nylon 4,6 article of Example IV above was compared to that of nylon 6 and nylon 6,6 using test bars of 120 mm length, 12.7 mm width and 1.6 mm thickness. The testbars were injection molded from the same materials as used in Example I. The test bars were first conditioned to an equilibrium humidity corresponding to 50% relative humidity at 23° C. and subsequently aged in a 50 weight % solution of zinc chloride in water, under a constant loading of 3 N/mm². The time until fracturing of the testbars was determined. The results of this experiment are represented in Table 2.

TABLE 2

| Fracture times of test bars under 3 N/mm² in a 50 wt % solution of ZnCl₂ | |
|---|---|
| Nylon 4,6 | >240 hours |
| Nylon 6 | about 10 minutes |
| Nylon 6,6 | about 15 minutes |

EXAMPLE VI (Stress crack resistance of injection molded test bars in methanol environment.)

The stress crack resistance in methanol of the nylon 4,6 of Example IV was compared to that of nylon 6 and nylon 6,6 with testbars as used for Example V, above.

The test bars were first dried at a temperature of 23° C. and then provided with a side notch of 1.5 mm (1 mm of Izod-notch and 0.5 mm of razor blade notch). The test bars were subsequently aged in methanol under a constant loading of 24 N/mm². The time to fracturing was determined. The results of this experiment are represented in table 3.

TABLE 3

| nylon 4,6 | >40 hours |
|---|---|
| nylon 6 | about 15 hours |
| nylon 6,6 | about 5 hours |

For reference to the manner by which the useful nylon 4,6 polyamide is prepared, see, again, U.S. application Ser. Nos. 246,548 and 247,545, the disclosures of which are incorporated herein by reference.

What is claimed is:

1. A shaped article formed by compression or injection molding a melt of a polyamide, consisting essentially of a molecular chain of units of $$-[NH-(CH_2)_4-NH-CO(CH_2)_4-CO]-$$

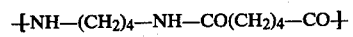

and which polyamide in the molded article has a relative viscosity of at least 2.5,
measured at 20° C., on a solution in 96% sulfuric acid, containing 1 g of polyamide in 100 ml of solution, and which article has
a heat distortion temperature value of at least 100° C., and an IZOD impact resistance value of at least 5 kilojoules per square meter.

2. Article according to claim 1, wherein said relative viscosity is from 3 to 5.

3. Article according to claim 1, molded at a temperature of between 290 and 330° C., with exclusion of oxygen and moisture.

4. Article according to claim 1 wherein said polyamide is a homopolyamide of 1,4-butanediamine with adipic acid.

5. Article according to claim 2, wherein said IZOD value is at least 7.5.

6. A process for the production of shaped articles made from the melt of a polyamide, which comprises compression or injection molding a nylon 4,6 polyamide consisting essentially of a molecular chain of repeating units of $$-[NH-(CH_2)_4-NH-CO-(CH_2)_4-CO]-$$

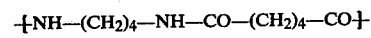

and which polyamide in the molded article has a relative viscosity of at least 2.5, measured at 20° C. on a solution in 96% sulfuric acid containing 1 g of polyamide in 100 ml of solution and has a heat distortion temperature value of at least 95° C. and an IZOD impact resistance value of at least 5 kilojoules per square meter.

7. Process according to claim 6, wherein said relative viscosity is from 3 to 5.

8. Process according to claim 6, wherein said polyamide is formed into said shaped article at a temperature of between 290° and 330° C., while excluding oxygen and moisture.

9. Process according to claim 6 wherein said polyamide is a homopolyamide of 1,4-butanediamine with adipic acid.

10. Process according to claim 7, wherein said IZOD value is at least 7.5.

* * * * *